United States Patent Office 2,696,483
Patented Dec. 7, 1954

2,696,483

DYEABLE COPOLYMERS OF ACRYLONITRILE

George E. Ham, Dayton, Ohio, assignor, by mesne assignments, to The Chemstrand Corporation, a corporation of Delaware No Drawing. Application February 27, 1950,
Serial No. 146,632

9 Claims. (Cl. 260—79.5)

This invention relates to a method of preparing acrylonitrile polymers having desirable receptivity for commercially available dyes. More specifically the invention relates to acrylonitrile polymers and fibers produced therefrom which can be dyed by conventional dyeing procedures utilizing acid dyes.

Polymers of acrylonitrile, such as polyacrylonitrile and copolymers of 75 or more percent of acrylonitrile and up to 25 percent of other monomers copolymerizable therewith, such as vinyl acetate, methyl methacrylate and methacrylonitrile, are well known to be excellent fiber-forming materials. However, due to poor dye receptivity, these known copolymers are of limited utility and of little value in the preparation of general purpose fibers. In copending application Serial No. 106,490, filed July 23, 1949, by George E. Ham, now Patent No. 2,656,336, and in application Serial No. 123,093, filed October 22, 1949, by George E. Ham, now Patent No. 2,635,092, there are described and claimed non-dyeable acrylonitrile polymers which are capable of chemical reaction with a wide variety of reagents, including trimethylamine and ammonia, whereby the copolymers are rendered capable of accepting dyes. This chemical reaction converts the copolymers containing $\alpha$-chlorocarboxylate radicals into copolymers containing amino or quaternary ammonium salt groups which are believed to be responsible for the improved dye receptivity.

The above described dye-receptive copolymers and the methods of preparing them are subject to inherent limitations due to the instability of the spinning solutions. The described methods are useful in the conventional fiber-spinning procedures whereby the acrylonitrile copolymers are dissolved in suitable solvents, for example N,N-dimethylformamide, N,N-dimethylacetamide, gamma-butyrolactone, and N,N-dimethylmethoxyacetamide. Solutions of the acrylonitrile polymers in the said solvents may be extruded to form fibers if the operation is conducted soon after the preparation of the solutions, otherwise gelation of the solutions may take place. If the spinning operations are not conducted promptly, or if there is an interruption of the normal spinning procedures, excessive losses of time and material may be experienced due to the gelation.

The primary purpose of the present invention is to provide a new procedure of spinning whereby gelation of polymer solutions is avoided. A further purpose of the present invention is to provide acrylonitrile copolymers capable of being dyed by conventional dyeing procedures. A still further purpose of the invention is to provide colored general purpose fibers of high tenacity from acrylonitrile.

It has been found that fiber-forming copolymers of acrylonitrile and the vinyl, allyl and methallyl esters of $\alpha$-halocarboxylic acids may be rendered dye-receptive by reacting the copolymers with a thiourea. A wide variety of the thioureas may be used including unsubstituted thiourea and the substituted thioureas having the following structural formula:

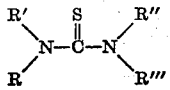

wherein R, R', R" and R'" may be hydrogen, alkyl, aryl, aralkyl, alkaryl, cycloalkyl and alkenyl radicals. The substituents may be methyl, ethyl, n-butyl, 2-ethylhexyl, allyl, benzyl, phenyl, p-methylphenyl, cyclohexyl and dimethyl phenyl radicals.

Suitable copolymers for the practice of this invention are copolymers of 75 to 98 percent by weight of acrylonitrile and from two to 25 percent of an ester having the structural formula:

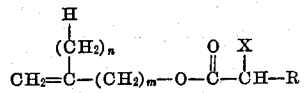

wherein X is a halogen atom of the group consisting of chlorine and bromine, R is a radical of the group consisting of hydrogen and alkyl radicals having up to four carbon atoms, $m$ and $n$ are each whole numbers from zero to one, inclusive, and $n$ is not greater than $m$. Although the copolymers of 75 to 98 percent of acrylonitrile and from two to 25 percent of the comonomers may be utilized in the practice of this invention, a preferred group of the copolymers are those of 80 to 95 percent acrylonitrile and from five to 20 percent of the said comonomer. The copolymers of 75 and 80 percent acrylonitrile have unusually desirable dye receptivity, but often are found to have less than the optimum fiber-forming properties. On the other hand, copolymers of 95 to 98 percent acrylonitrile and from two to five percent of the comonomer have unusually good fiber-forming properties, but often lack sufficient dye receptivity for optimum utility.

The reactive copolymers may, if desired, contain small proportions of other monomers copolymerized therewith, for example up to ten percent of styrene, methacrylonitrile, alkyl acrylates, alkyl methacrylates, vinylidene chloride, alkyl fumarates, alkyl maleates or other polymerizable monomer. In general the proportions of other monomers should not be large or either the dyeability or the optimum fiber properties may be lost.

In the practice of this invention the non-dyeable copolymers are treated with thiourea or a substituted thiourea to develop dye receptivity. The copolymers may be treated with the reagent directly or with solutions of reagent in water or other liquid media in which it is soluble. In the practice of this modification of the invention the reagent is dissolved in the solvent at any suitable temperature up to 150° C., and the finely ground copolymers are dispersed in the solution.

An alternative procedure for practicing this invention involves the dissolution of both thiourea, or substituted thiourea, and the copolymer in a mutual solvent. This modification of the invention may be practiced with the conventional acrylonitrile copolymer solvents, for example N,N-dimethylformamide, N,N-dimethylacetamide, gamma-butyrolactone, and nitromethane. In this manner a more intimate dispersion of the copolymer and the reagent will be obtained, and a more nearly complete inter-reaction thereby achieved.

A further procedure by which the present invention may be practiced involves the preliminary preparation of fibers of the non-dyeable copolymers and subsequent treatment with thiourea, or a substituted thiourea, either in solid finely divided form or in suitable solution. Since this treatment will be primarily a surface effect, obviously an effective improvement in dyeability will be achieved with a minimum quantity of reagent. A desirable procedure by which the treatment of the fiber can be effected, involves the treatment with a mixture of water and a suitable solvent for acrylonitrile copolymers in which thiourea has been dissolved or dispersed.

The present invention may further be practiced by treating the polymers or fibers thereof with the reagents simultaneously with a dyeing procedure. In accordance with this method the conventional dye baths used in the dyeing of fibers may be charged with a substantial proportion of thiourea, whereby deep colored shades may be developed through the use of acid dyestuffs.

The above described procedures for reacting thiourea with non-dyeable acrylonitrile polymers does not necessitate a complete reaction by the thiourea and the copolymer. The nature of the reaction is not completely understood, however, it is believed to be a chemical reaction by the thiourea and the chlorine of the interpolymerized comonomer to form a salt having the grouping:

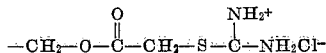

These salt groups appear to be capable of reacting with acid dyes to form a chemically bonded dyestuff which is fast to laundering and dry cleaning, preferred dyes for this purpose being the sulfonate dyes.

The proportion and concentration of thiourea or other reagent can be varied over wide ranges depending upon the extent of dye receptivity desired, the concentration of reactive groups in the polymer, and the physical state of the reaction medium. To achieve dye receptibility within a reasonably short period of time more than two percent halocarboxylic esters should be in the copolymer. Under such conditions relatively concentrated solutions of thiourea or other reagent should be used. When treating copolymers prepared from intermediate proportions of the halocarboxylate more dilute solutions can be used effectively and the polymer may be treated after the fiber is spun without requiring excessive contact periods. If the treatment involves the use of very dilute reagent solution the copolymer should be one of relatively high reactive groups content. Reaction in a mutual solvent is useful when both the halocarboxylate ester concentration and the reagent concentration are low.

The acrylonitrile copolymers may be prepared by any conventional polymerization procedure, but the preferred practice utilizes suspension polymerization wherein the copolymer is prepared in finely divided form for immediate use in the fiber fabrication operations. The preferred suspension polymerization may utilize batch procedures, wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of copolymer may also be employed.

The polymerization is catalyzed by means of any water soluble peroxy compound, for example the potassium, ammonium, and other water soluble salts of peroxy acids, sodium peroxide, hydrogen peroxide, sodium perborate, the sodium salts of other peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain aliphatic alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art.

The optimum methods of polymerization for preparing fiber forming acrylonitrile polymers involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from .001 to two percent on the weight of the monomer to be polymerized.

When the polymerization is complete, the polymer is separated from the aqueous medium by any of the conventionally used methods. If the dispersion is very stable it may be necessary to break the emulsion, for example by adding acids, bases, salts or alcohol. When the optimum procedures above described are used, the polymer may be separated from the aqueous phase by filtration. The resulting polymer in either case may require washing operations to remove traces of soluble catalyst or dispersing agent.

The copolymer of acrylonitrile used in the practice of this invention should be of uniform chemical and physical properties and of relatively high molecular weight. Molecular weights as low as 10,000 may be used but preferred practice involves the use of copolymers with molecular weights between 25,000 and 150,000.

The copolymers of acrylonitrile and the α-halocarboxylic esters are spun into fibers by conventional procedures. The polymers are dissolved in suitable solvents, for example N,N-dimethylformamide, N,N-dimethylacetamide, and N,N-dimethylmethoxyacetamide, and the solutions extruded through a suitable die, or a spinneret containing a plurality of apertures into a medium which removes the solvent and precipitates the polymer in a continuous form. The spinning medium may be a liquid medium, for example glycerine, water, or aqueous solutions of salts, acids or bases, or aqueous mixtures of organic liquids, such as glycerine or even liquids which are solvents for the polyacrylonitrile. The use of aqueous mixtures of conventional acrylonitrile polymer solvents produces a fiber of more desirable physical properties than is prepared by precipitation into water alone. The fiber may also be extruded into air or other gaseous medium by conventional dry spinning methods.

Further details of the practice of this invention are set forth with respect to the following examples. In these examples a standard dyeing technique was used, comprising 1.0 ml. of two percent dyestuff, 5 cc. of three percent sulfuric acid, and 40 cc. of water for each gram of fiber treated.

*Example 1*

A skein comprised of four-denier filaments of a copolymer of 92.2 percent acrylonitrile and 7.8 percent of allyl chloroacetate (1.25 g.), was immersed in a solution of seven grams of thiourea in 36 grams of water. After heating for five minutes at 100° C., the fiber was removed, washed with water and dried. It was dyed with a mixture of 1.25 mls. of two percent Wool Fast Scarlet, 6 mls. of three percent sulfuric acid and 55 mls. of water. A brilliant scarlet color was developed in the fiber. A sample of the same fiber which had not been treated with thiourea was dyed in the identical manner but only a pale pink coloration was developed in the fiber. The dyed fiber was fast to laundering and dry cleaning operations in the presence of wool, cotton, silk, nylon, acetate rayon and viscose.

*Example 2*

A 50 gram sample of a copolymer of 92.2 percent acrylonitrile and 7.8 percent allyl chloroacetate was heated for five minutes at 100° C., with a solution of 21 grams of thiourea in 108 grams of water. The slurry was filtered and washed with three portions of boiling water and dried. The sample was analyzed for ionic chlorine content which was found to be 0.812 percent, whereas the original chlorine content was 2.05 percent, 60.4 percent of the available chlorine being reacted. A film of the copolymer cast from a solution of dimethylacetamide was prepared and found to be dyeable with Wool Fast Scarlet to a brilliant scarlet shade. A film of the same copolymer which had not been treated with thiourea was undyeable by the same procedure.

*Example 3*

A total of 86 grams of a 21 percent solution of 92 percent acrylonitrile and eight percent vinyl chloroacetate in N,N-dimethylacetamide was prepared. A 1.45 gram sample of thiourea was added and intimately dispersed therein. After being heated for twenty-four hours at 70° C., an ionic chlorine analysis indicated complete reaction between the thiourea and the copolymers. Fibers were spun from this solution and found to be dyeable with Wool Fast Scarlet dye.

*Example 4*

A skein of fiber 0.52 grams in weight of a copolymer of 89.4 percent acrylonitrile and 10.6 percent vinyl chloroacetate was treated at 100° C., with a solution of seven grams of thiourea and 36 grams of water for one minute. After washing with water the fiber was dyed with Wool Fast Scarlet dye using the standard procedure described in Example 1. After one hour at 100° C., the dye bath was 80 percent exhausted and the fiber was dyed a deep scarlet color.

*Example 5*

A 1.3 grams sample of a fiber of a copolymer of 91 percent acrylonitrile and nine percent allyl chloroacetate was treated with a solution of five grams of allyl thiourea in 50 grams of water for sixty minutes at 100° C. After washing with hot water the fiber was dyed with the standard dyeing technique described above and a deep scarlet fiber was thereby obtained.

*Example 6*

A 1.0 gram skein of a copolymer of 95.8 percent acrylonitrile and 4.2 percent allyl chloroacetate was immersed in 46 mls. of Wool Fast Scarlet dye solution to which 1.0 grams of thiourea had been added. After ten minutes at 100° C. the dye bath was exhausted and the fiber was dyed a deep scarlet color.

*Example 7*

A copolymer of 91 percent acrylonitrile and nine percent of allyl chloroacetate was dissolved in N,N-dimethylacetamide and extruded through a spinneret having thirty apertures, each .0035 inches in diameter, into a mixture of two parts of water and one part of N,N-dimethylacetamide at 40° C. The fiber so prepared was stretched 3.3 times in an atmosphere of steam at 130° C. The fiber was then dyed for thirty minutes at 100° C., in a bath consisting of 60 mls. of water, 1.3 mls. of two percent Wool Fast Scarlet, 5.9 mls. of three percent sulfuric acid, and 0.1 grams of thiourea. Complete dye bath exhaustion was obtained and the fiber was dyed a deep scarlet. The tensile strength and thermal resistance of the yarn were not affected by the procedure. A sample of the same fiber treated in a similar dye bath without the use of thiourea did not absorb an appreciable amount of the dye. A skein dyed as above with 40 percent of the fiber weight as thiourea gave dye bath exhaustion in ten minutes.

*Example 8*

The procedure of the preceding example was duplicated using Alizarin Light Blue 4GL and Wool Fast Yellow, except that 0.2 grams of thiourea were used in the dye bath. Deep shades of colored fibers were thereby prepared.

The invention is defined by the following claims:

1. A method of preparing dye-receptive, non-hydrolyzed, fiber-forming copolymers, which comprises chemically reacting a copolymer of 75 to 98 percent by weight of acrylonitrile and from 2 to 25 percent of a monomer having the structural formula:

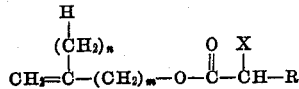

wherein X is an atom of the group consisting of chlorine and bromine, R is a radical of the group consisting of hydrogen and alkyl radicals having up to four carbon atoms, $m$ and $n$ are small whole numbers from zero to one, inclusive, and $n$ is not greater than $m$, with a compound having the structural formula:

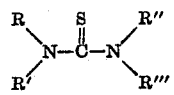

wherein R, R', R'', and R''' are radicals selected from the group consisting of hydrogen, alkyl, aryl, aralkyl, cycloalkyl and alkenyl radicals, at least one of said radicals being hydrogen, by dissolving the copolymer and compound in an organic solvent for the copolymer and compound and heating the solution to effect chemical reaction.

2. The method as defined in claim 1 wherein the monomer is allyl chloroacetate and the compound is thiourea.

3. The method as defined in claim 1 wherein the monomer is vinyl chloroacetate and the compound is thiourea.

4. The method as defined in claim 1 wherein the monomer is methallyl chloroacetate and the compound is thiourea.

5. A method of preparing dye-receptive, non-hydrolyzed, fiber-forming copolymers from copolymers of 80 to 95 percent by weight of acrylonitrile and from 5 to 20 percent of a monomer having the structural formula:

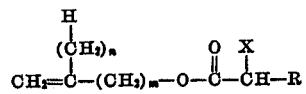

wherein X is an atom of the group consisting of chlorine and bromine, R is a radical of the group consisting of hydrogen and alkyl radicals having up to four carbon atoms, $m$ and $n$ are small whole numbers from zero to one, inclusive, and $n$ is not greater than $m$, which comprises chemically reacting said copolymers with a compound having the structural formula:

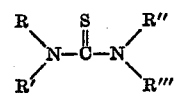

wherein R, R', R'' and R''' are radicals selected from the group consisting of hydrogen, alkyl, aryl, aralkyl, cycloalkyl and alkenyl radicals at least one of said radicals being hydrogen, by dissolving the copolymer and compound in a mutual organic solvent therefor and heating the solution to effect chemical reaction.

6. The method as defined in claim 5 wherein the monomer is allyl chloroacetate and the compound is thiourea.

7. The method as defined in claim 5 wherein the monomer is vinyl chloroacetate and the compound is thiourea.

8. The method as defined in claim 5 wherein the monomer is methallyl chloroacetate and the compound is thiourea.

9. The method as defined in claim 5 wherein the compound is thiourea.

References Cited in the file of this patent

UNITED STATES PATENTS

| Number | Name | Date |
|---|---|---|
| 2,332,899 | D'Alelio | Oct. 26, 1943 |
| 2,637,620 | Ham | May 5, 1953 |